United States Patent
Guoan et al.

(10) Patent No.: US 6,584,697 B1
(45) Date of Patent: Jul. 1, 2003

(54) SURVEYORS ELEVATION MEASURING STICK AND METHOD

(76) Inventors: Joseph R. Guoan, 111 Mackinaw St., Augres, MI (US) 48703; Charles N. Woods, 1629 E. Huron Rd., Omer, MI (US) 48749

( * ) Notice: Subject to any disclaimer, the term of this patent is extended or adjusted under 35 U.S.C. 154(b) by 0 days.

(21) Appl. No.: 10/081,811

(22) Filed: Feb. 22, 2002

Related U.S. Application Data

(60) Provisional application No. 60/270,654, filed on Feb. 22, 2001, and provisional application No. 60/277,109, filed on Mar. 19, 2001.

(51) Int. Cl.[7] ............................................. G01C 15/06
(52) U.S. Cl. ......................................................... 33/293
(58) Field of Search .............................. 33/293, 294, 295, 33/296, 809, 484, 486, 487, 488, 464; 248/125.1, 161, 542; 52/111, 736.4, 105

(56) References Cited

U.S. PATENT DOCUMENTS

| | | | | |
|---|---|---|---|---|
| 337,959 A | * | 3/1886 | Keuffel ........................ | 33/293 |
| 2,660,822 A | * | 12/1953 | Hargus ........................ | 40/606 |
| 3,460,260 A | * | 8/1969 | Sarlandt ....................... | 33/292 |
| 3,487,550 A | * | 1/1970 | Herman et al. ................ | 33/228 |
| 3,521,341 A | * | 7/1970 | Hornlein et al. ........ | 29/898.066 |
| 3,835,486 A | * | 9/1974 | Benoit et al. ................. | 5/503.1 |
| 4,183,689 A | * | 1/1980 | Wirges et al. ................. | 403/31 |
| 4,318,228 A | * | 3/1982 | Kimura ........................ | 33/809 |
| 4,345,382 A | * | 8/1982 | Warren ........................ | 33/294 |
| 4,901,992 A | * | 2/1990 | Dobeck ....................... | 269/315 |
| 5,687,486 A | * | 11/1997 | Foltz ........................... | 33/296 |
| 6,209,210 B1 | * | 4/2001 | Stout ........................... | 33/293 |
| 2002/0073571 A1 | * | 6/2002 | Brannon, Sr. ................. | 33/809 |

* cited by examiner

*Primary Examiner*—Diego Gutierrez
*Assistant Examiner*—R. Alexander Smith
(74) *Attorney, Agent, or Firm*—Reising, Ethington, Barnes, Kisselle & Learman, P.C.

(57) ABSTRACT

The civil engineering elevation measuring stick for use in a laser elevation measuring system includes a primary pole with a top end, a bottom end at least four flat side walls. A top end cap, a bottom end cap are attached to the primary pole. A secondary tubular pole telescopically receives the primary pole. Bearings support the secondary tube for sliding movement relative to the primary pole between the top and bottom end caps. A laser beam receiver mounting surface is provided on the secondary tube. A measuring scale is fixed to the primary pole in a location that permits the direct measurement of the deviation between the elevation of a measured surface and desired grade surface.

8 Claims, 6 Drawing Sheets

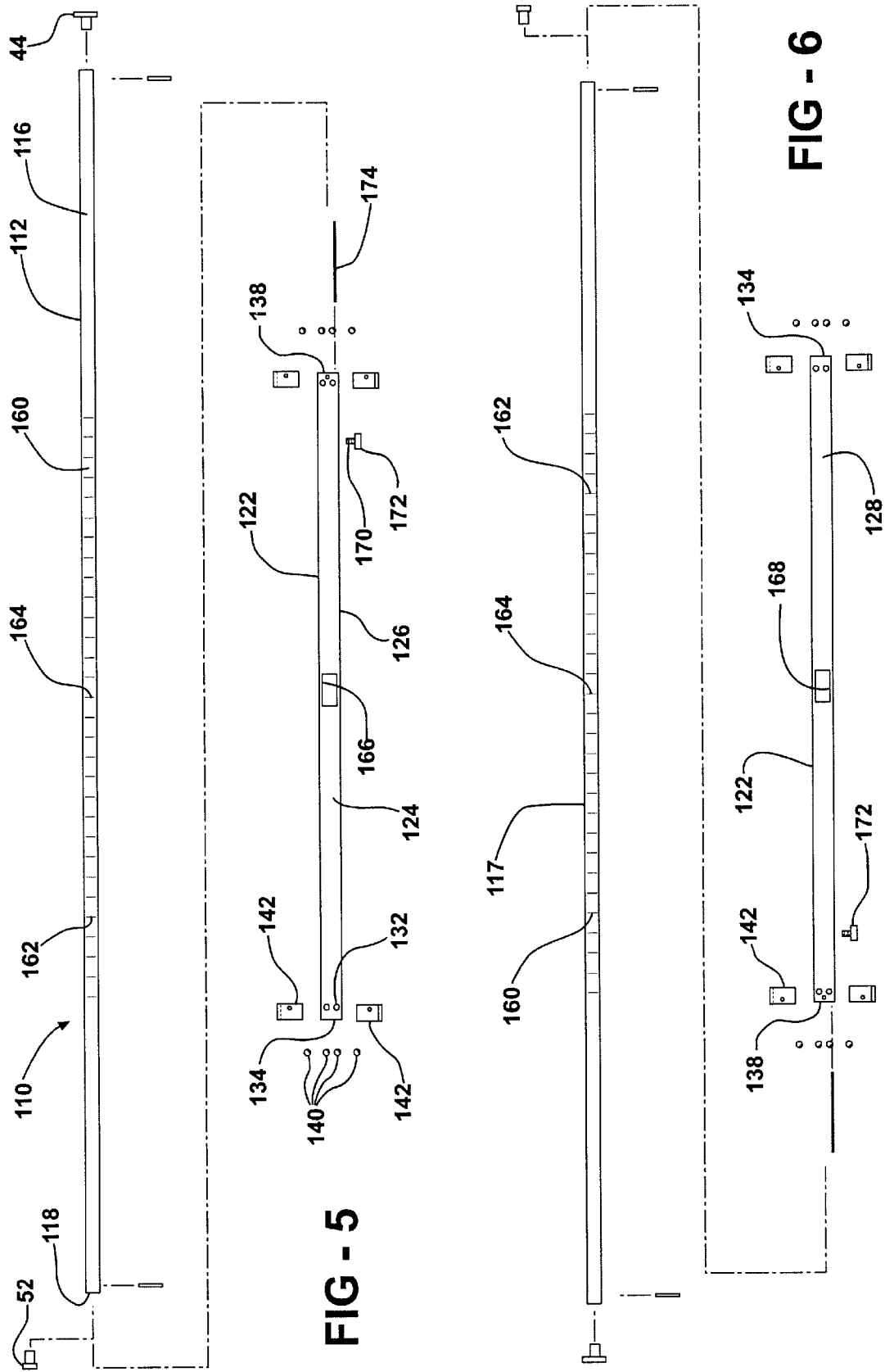

SURVEYORS ELEVATION MEASURING STICK AND METHOD

The disclosure incorporates the surveyors elevation measuring stick and method disclosed in provisional patent applications 60/270,654 filed Feb. 22, 2001 and 60/277,109 filed Mar. 19, 2001, whose priority is claimed for this application.

TECHNICAL FIELD

The surveyors elevation measuring stick is used in combination with a laser beam system to measure the difference between the actual elevation and the desired elevation at any given location.

BACKGROUND OF THE INVENTION

Earth moving equipment is used to move soil and excavate for civil engineering projects. An underground pipe laid in a ditch to carry liquids conveyed by gravity must have a uniform and constant change in elevation. If the pipe has portions that are lower than planned and portions that are higher than planned, liquid will be held in the low spots and solids will settle out of the liquid in these low areas. Over a period of time, the capacity of the pipe will be decreased and the pipe may even become plugged.

A building foundation must be level or at least have level sections and steps with a known elevation change. If the foundation is not level, building walls are unlikely to be vertical. Building walls that are not vertical are generally weaker than planned and could overtime collapse.

Roads and airport runways are generally not level. However they must have sections with a uniform change in elevation. They may also have side slopes in a direction transverse to the direction of vehicle traffic to carry water away. High areas and low areas can hold water and force vehicles to reduce speed. High spots in low areas on a runway can render a runway unusable for high speed aircraft. Such areas can also increase loads on aircraft structures and reduce the useful life of aircraft.

The above examples relate to structures that require careful measurement of elevation during construction. Many more examples could be given.

Civil engineers and others have used a transit and a measuring stick to measure and calculate elevations at selected positions. These devices have required skilled individuals and meticulous records to avoid mistakes in measuring and in calculating results.

Lasers are available today to assist in determining elevations. Such devices can improve the accuracy and speed up the measuring process. However, the measuring stick generally has a graduated scale that starts at the surface and extends upward. When using a laser and a measuring device, the actual elevation at a given point is measured. Then we determine what the elevation should be. Finally the deviation from the desired elevation is calculated. Once the deviation is known, the information is given to a machine operator and he can make required changes. These changes are usually made by removing or adding materials such as rock and soil.

The measuring procedure takes time. While measurements are taken, calculations are made and the results are relayed to a machine operator, the operator and an expensive earth moving machine are frequently idle. This idle time can be very expensive.

Mistakes are frequently made when calculating the results of a elevation measurement. In some cases one measurement is subtracted from another measurement or calculation. In other cases a measurement is added to another measurement or calculation. It is easy to add when you should have subtracted it is also easy to make errors when adding or subtracting measurements that are to the nearest sixteenth of an inch. Making such calculations is, as mentioned above, time consuming.

SUMMARY OF THE INVENTION

The civil engineering elevation measuring stick is for use in a laser beam measuring system. The measuring stick includes a primary pole with a top end and a bottom end. A secondary tube telescopically receives the primary pole. The length of the secondary tube from the secondary tube top end to the secondary tube bottom end does not substantially exceed half the length of the primary pole. Four flat secondary walls of the secondary tube extend from the secondary tube bottom end to the secondary tube top end. A pair of spaced apart bottom apertures adjacent to the secondary tube bottom end pass through each of the four flat secondary walls. A pair of spaced apart top apertures adjacent to the secondary tube top end pass through each of the four flat secondary walls. A top ball bearing is positioned in each aperture of the pairs of spaced apart top apertures. A bottom ball bearing is positioned in each aperture of the pairs of bottom ball bearing apertures. Ball bearing retainers hold the top and bottom ball bearings in the apertures. The top and bottom ball bearings prevent contact between inside surfaces of the secondary tube and the primary pole thereby allowing the secondary tube to move freely on the ball bearings between the primary pole top end and the primary pole bottom end. A top end cap and a bottom end cap on the primary pole limit movement of the secondary tube relative to the primary pole. Laser beam receiver mounting surfaces are provided on the secondary tube. At least one measurement scale is provided on the primary pole to measure the distance the secondary tube is moved relative to the primary pole from an index position when a laser beam receiver clamped to the secondary tube is centered on a laser beam. The measured distance indicates the distance a surface supporting the bottom end of the primary pole is above or below the desired elevation thereby indicating how much material is to be removed or how much material is to be added.

One version of the measuring stick includes a spring that urges the secondary tube toward the primary pole top end. With this version, the index point from which measurements are taken is at the top of the primary pole. This version is used when excavating and accurately indicates how much material remains to be removed.

The other version of the measuring stick has an index point, from which measurements are taken, in the center portion of the primary pole. Two scales are provided on the primary pole. Both scales start at the index point. The upper scale increases as you move up from the index point. The lower scale increases as you move down from the index point. A viewing aperture with a position indicator is provided in a wall of the secondary tube. The upper scale encase the quantity of fill that is required. The lower scale indicates the quantity of material that is to be removed. With this version, a clamp is provided to hold the secondary tube in a fixed position relative to the primary pole while the scales are read.

Both versions of the measuring stick measure the deviation from the desired elevation without the need to make calculations. Eliminating calculations in the field saves time and reduces errors.

BRIEF DESCRIPTION OF THE DRAWING

These and other features and advantages of the present invention will become more readily appreciated when considered in connection with the following detailed description and appended drawings, wherein:

FIG. 5 is an expanded front elevational view of the modified measuring stick;

FIG. 6 is an expanded rear elevational view of the modified measuring stick;

DETAILED DESCRIPTION OF THE PREFERRED EMBODIMENT

Figure 1:
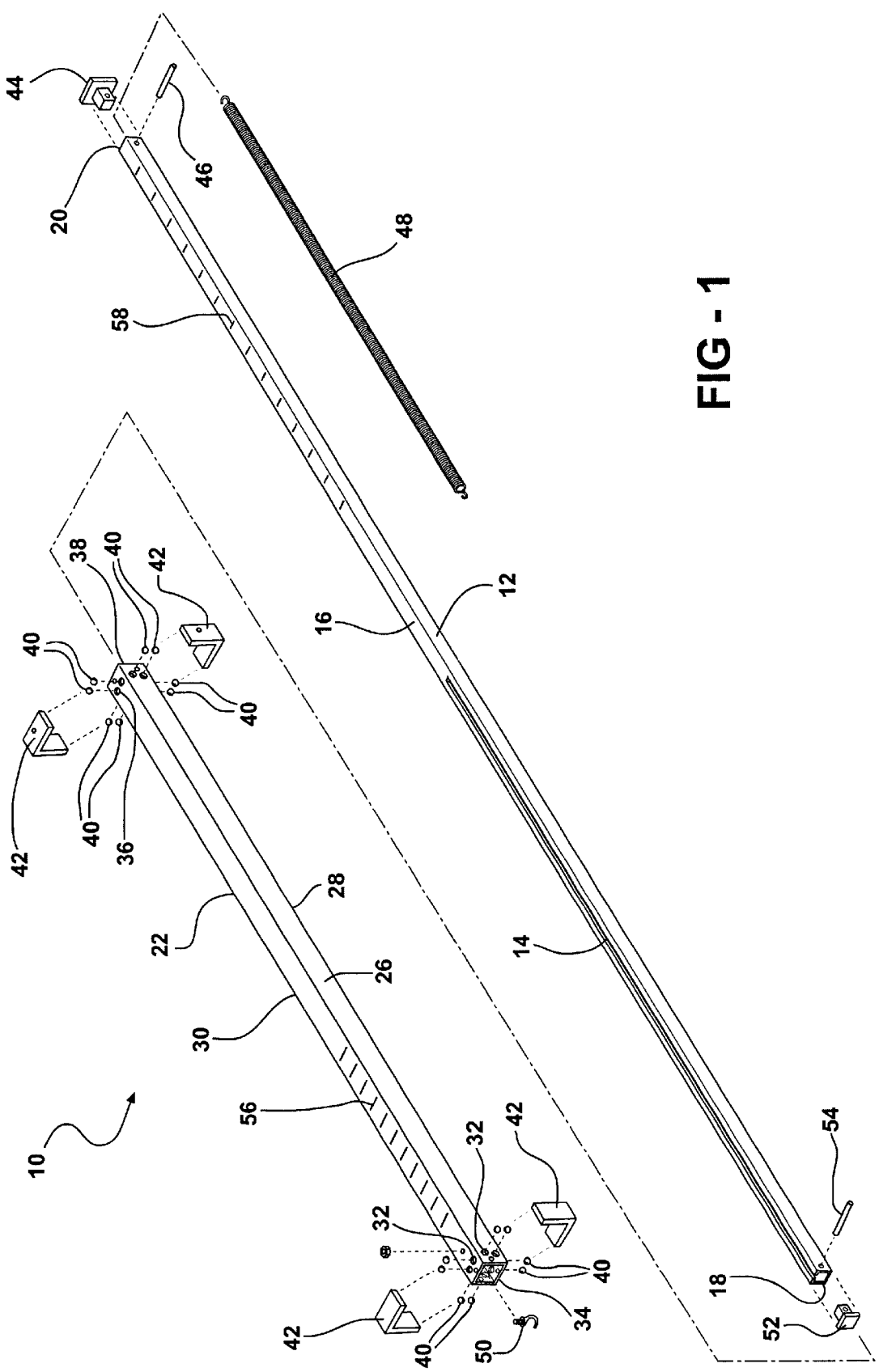
FIG. 1 is an expanded perspective view of the measuring stick.
Figure 2:
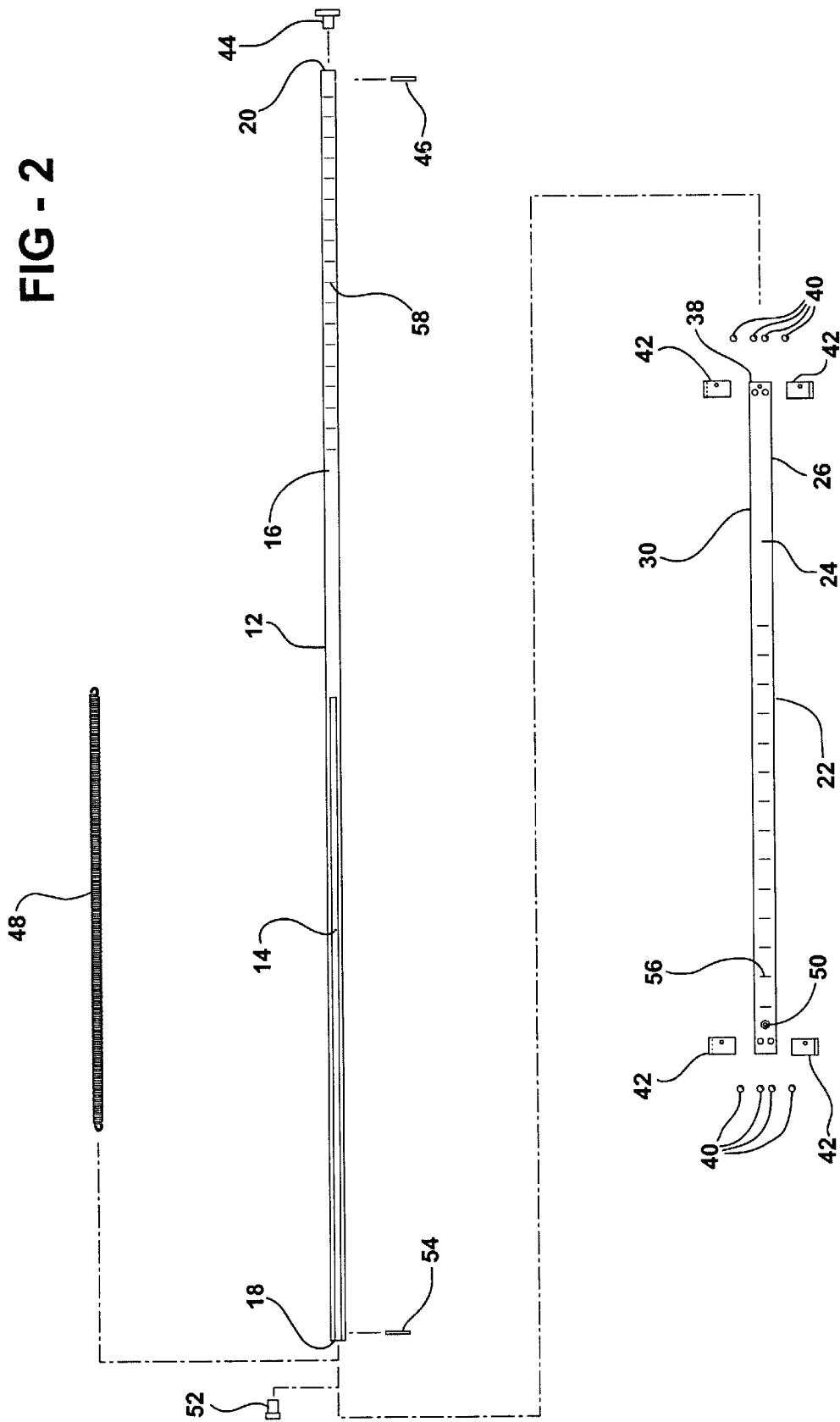
FIG. 2 is an expanded plan view of the measuring stick.
Figure 3E:
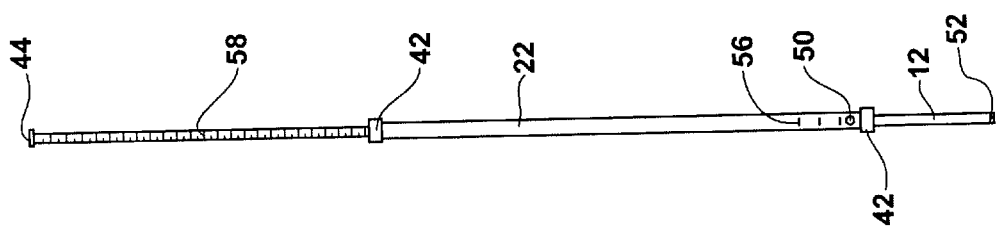
FIG. 3E is an elevational view similar to FIG. 3A indicating the total quantity of material to be removed to obtain the desired grade level.
Figure 3D:
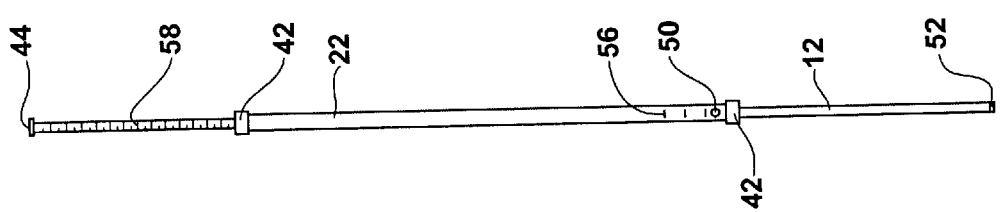
FIG. 3D is an elevational view similar to 3C indicating that a large quantity remains to be removed.
Figure 3C:
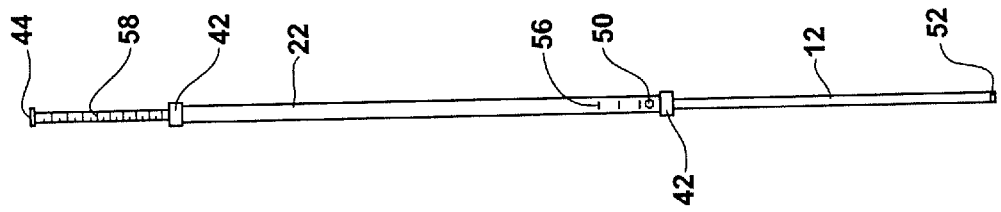
FIG. 3C is an elevational view similar to FIG. 3B indicating that an intermediate quantity of material remains to be removed.
Figure 3B:
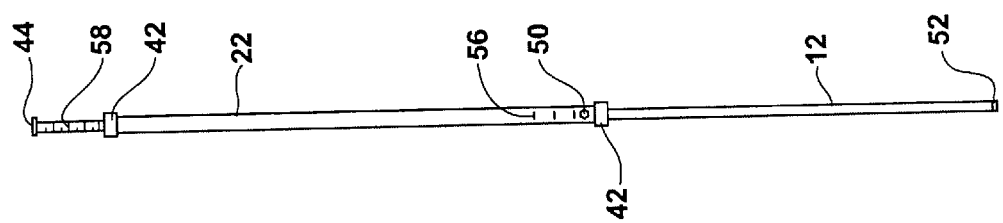
FIG. 3B is an elevational view similar to FIG. 3A indicating that a relatively small quantity of material remains to be removed.
Figure 3A:
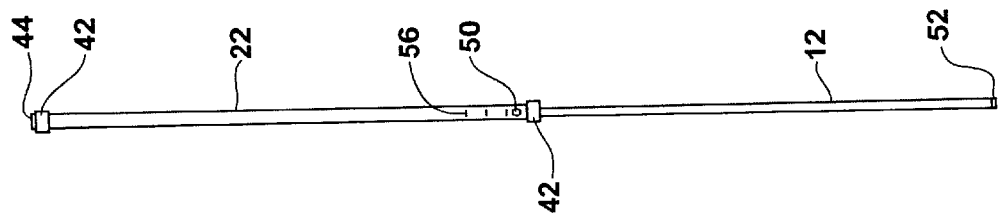
FIG. 3A is an elevational view of the measuring stick with the secondary tube against the top end cap and with the index mark at the top end of the primary pole.
Figure 4:
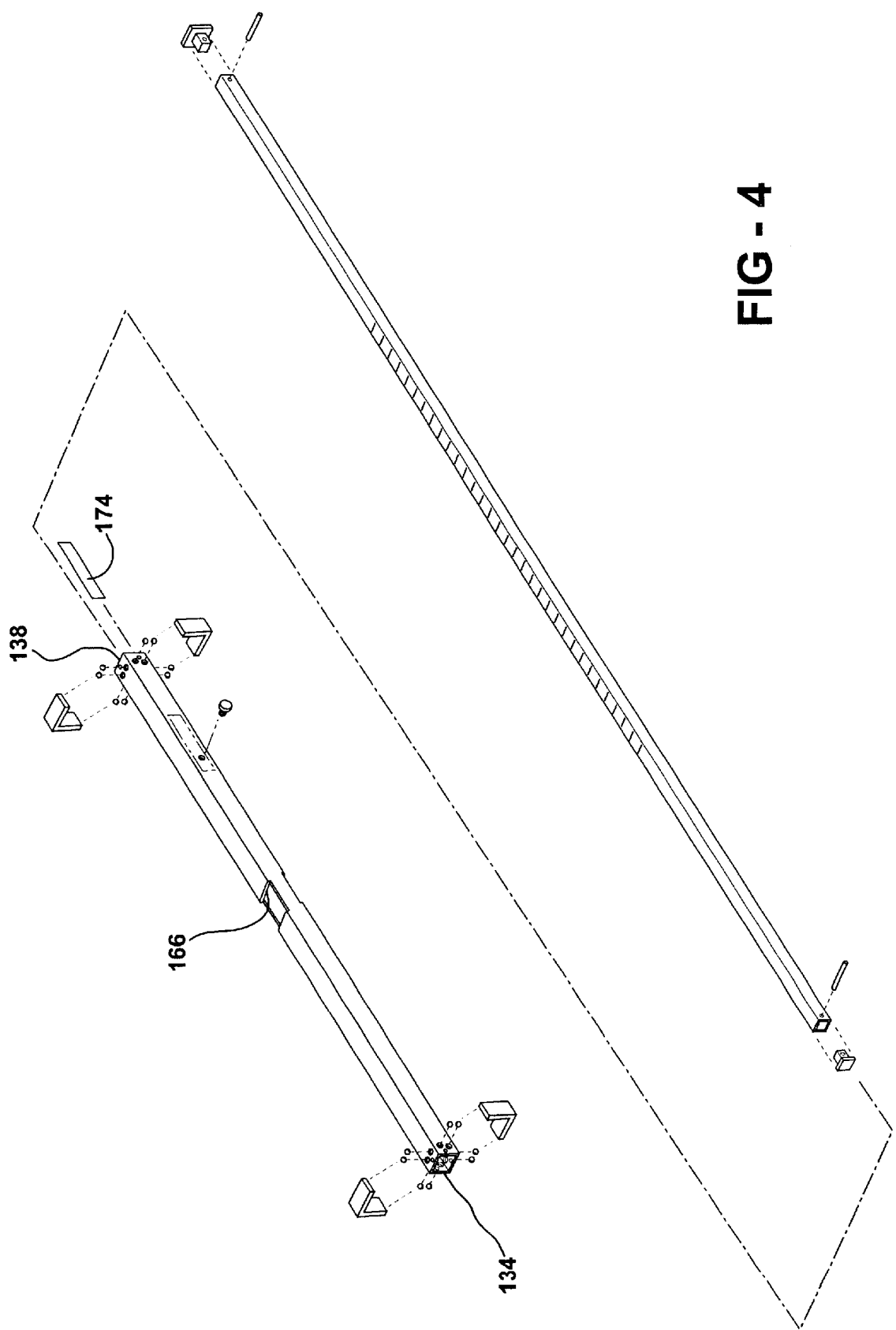
FIG. 4 is an expanded perspective view of a modified measuring stick with an index mark on the center of the primary pole.
Figure 7E:
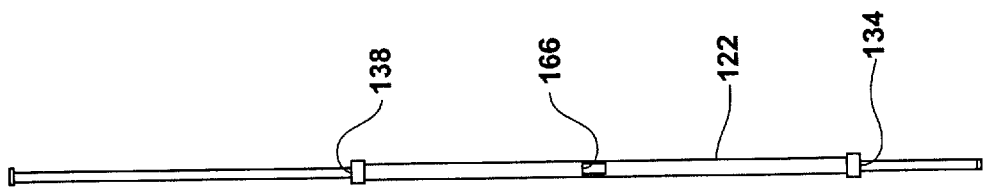
FIG. 7E is an elevational view of the modified measuring stick when additional excavation is required.
Figure 7D:
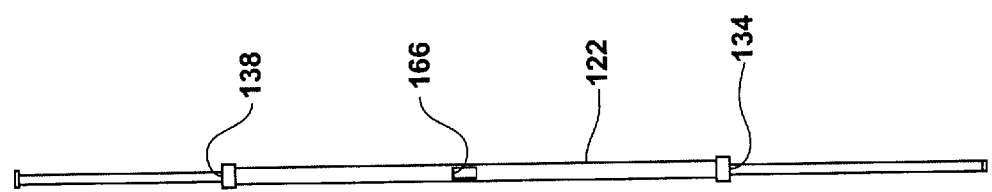
FIG. 7D is an elevational view of the modified measuring stick when a small quantity of filling is required.
Figure 7C:
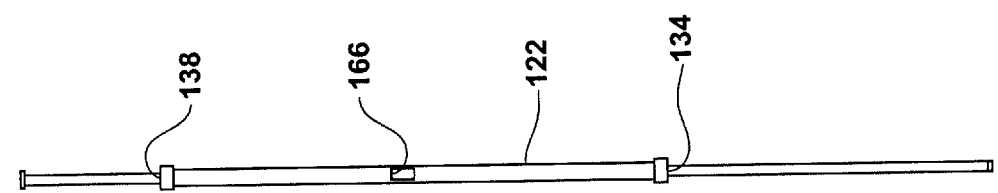
FIG. 7C is an elevational view of the modified measuring stick when substantial filling is required.
Figure 7B:
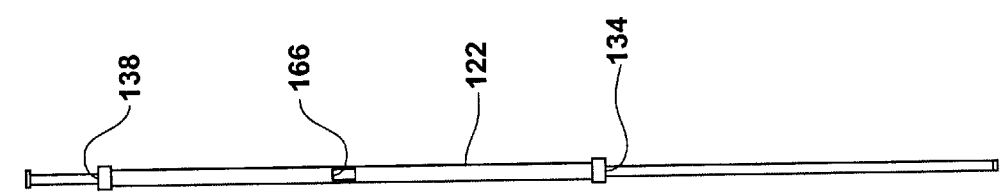
FIG. 7B is an elevational view of the modified measuring stick after partial filling.
Figure 7A:
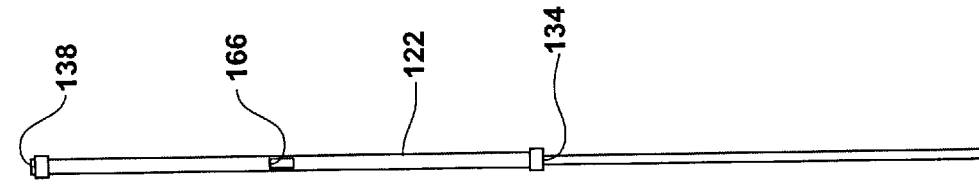
FIG. 7A is an elevational view of the modified measuring stick at the beginning of a filling operation to raise the level of the surface.

The measuring device 10 includes a main pole 12. The main pole 12 is an elongated square tube. A slot 14 in one wall 16 of the main pole 12 extends from the main tube bottom 18 to about midway between the main tube bottom and the main tube top 20.

A square secondary tube 22 that is about one half the length of the main pole 12 telescopically receives the main pole. The secondary tube 22 has an inside dimension that is somewhat larger than the outside dimensions of the main pole 12. The secondary tube 22 has side walls 24, 26, 28 and 30. Two apertures 32 are bored through each side wall 24–30 near the lower tube end 34 in positions adjacent to adjacent side walls and spaced from each other. Two additional apertures 36 are bored through each side wall 24–30 near the upper end 38 in positions adjacent to adjacent side walls and spaced from each other. These apertures 32 and 36 are spaced apart and near adjacent side walls to provide space for measurement scales between the ball races on the side walls for the main pole. A bearing ball 40 with a diameter that exceeds the wall thickness of the side walls 24–30 is inserted in each of the apertures 32 and 36. Bearing plates 42 of a molded nylon material are secured to the side walls 24–30 of the secondary tube 22, in positions that cover the apertures 32 and 36, by screws. The bearing plates 42 load the balls 40 and center the main pole 12 radially within the secondary tube 22. The bearing plates 42 are connected together in pairs so that two screws secure each pair of connected bearing plates 42 to retain the plates in fixed positions on the secondary tube 22. The balls 40 act as bearings to guide the secondary tube 22 when it is moved axially relative to the main pole 12.

A top cap 44 is fixed to the top 20 of the main pole 12 by a roll pin 46. A tension spring 48 has an upper end connected to the top cap 44 and is received within the main pole 12. The lower end of the spring is connected to a hook 50 that passes through the slot 14 in the wall 16 of the main pole 12 and is bolted to the secondary tube 22. A bottom cap 52 is secured to the main tube bottom 18 by a roll pin 54. The top cap 44 and the bottom cap 42 limit axial movement of the secondary tube 22 relative to the main pole 12. The spring 48 urges the secondary tube 22 toward the top cap 44.

A scale 56 on the side wall 24 of the secondary tube 22 starts at 36 inches near the lower end 34 and extends up to the upper tube end 38 and a seventy one inch mark. When the secondary tube 22 has its upper end 38 in contact with the top cap 44, the starting mark of 36 inches on the scale 56 is 36 inches from the bottom end of the bottom cap 52. scale 58 is fixed to the wall 16 of the main pole 12 and extends downward toward the slot 14. The one inch mark on the scale 58 is one inch from the top cap 44 and an index point. The numbers on the scale 58 increase as you move from the top 20 of the main pole 12 toward the main pole bottom 18. The scale 58 as shown ends at about 34 inches.

The length of the measuring device 10 can be manufactured with increased or decreased length as required to accomplish different measuring tasks.

During use of the measuring device 10, a laser beam receiver is clamped to the secondary tube 22. Generally the laser beam receiver is clamped to the secondary tube 22 at a height of the beam from a reference surface, where the reference surface is on the desired grade line. If the laser beam generator is for example 41 and ⅛ inches from a reference surface, the beam receiver is clamped to the secondary tube 22 at the 41 and ⅛ inch level. To determine how much material needs to be removed at a selected location, the bottom cap 52 on the main pole 12 is positioned on the surface of the soil that is to be removed with the main pole held in a vertical position. The secondary tube is than lowered manually against the tension of the spring 48 until a beam receiver is centered on the laser beam. The distance the secondary tube 22 is lowered is read on the scale 58 on the main pole 12 while the laser beam is centered on the beam receiver. The distance measured on the scale 58 indicates the depth of the soil or other material that is to be removed at that location. No calculations are required. In many situations, the operator of an excavator or other earth moving machine can observe the position of the secondary tube 22, from his operator station, when the measurement is taken and proceeds to remove the material without discussions with the person making the measurement. When the person making the measurement does not have to climb out of a trench and climb up onto the excavator to relay information, productivity is improved substantially.

The modified measuring device 110 is similar to the measuring device described above. The modified measuring device 110 is employed when the surface that is being shaped is close to the desired grade and some areas need to be raised while other areas need to be lowered. It has a main or primary pole 112 that is an elongated square tube. A square secondary tube 122 that is about one half the length of the main pole 112 telescopically receives the main pole. Bearing plates 142 and bearing bails 140 in apertures 132 permit the secondary tube 122 to slide relative to the main pole 112.

Two measuring tapes 160 and 162 are provided on one wall 116 of the main pole 112. Both tapes 160 and 162 start at zero in the center 164 of the main pole 112. Measuring tapes 160 and 162 are also provided on the wall 117 of the main pole 112. Tape viewing apertures 166 and 168 are provided in walls 124 and 128 of the secondary tube 122. Each of these apertures 166 and 168 expose the measuring tapes 160 and 162 and are midway between the lower tube end 134 and the upper tube end 138. A set screw 170, with a knob 172 for manual rotation of the set screw, screws into the wall 126 of the secondary tube 122. Tightening the set screw 170 holds the position of the secondary tube 122 relative to the main pole 112. A Teflon wear strip 174 is mounted between the wall 126 of the tube 122 and the adjacent wall 176 of the pole 112 to prevent set screw 170 from damaging the surface of the pole. The wear strip 174 can be attached to the pole 112 or it can be attached to the inside of the tube 122 and move with the tube.

The modified measuring device 110 can use the top and bottom edges of one of the tape viewing apertures 166 or 168 as position indicators or a wire 190 can extend across the center of each of the apertures. If the top and bottom edges of the viewing apertures 166 and 168 are both used, the positions of the measuring scales 160 and 162 will have to be adjusted to accommodate the space between the two edges. When the secondary tube 122 is centered on the main pole 112, both edges of viewing apertures would have to be on zero start points of the scales 160 and 162.

During use of the modified measuring device 110, the secondary tube 122 is clamped to the main pole 112 with an indicator 190 in one of the apertures in alignment with the zero mark on both scales 160 and 162. A laser beam receiver is elevated to a position in which it is centered on a laser beam, when the main pole bottom 118 is supported on a reference surface that is on the desired grade line, and clamped to the secondary tube 122. The bottom 118 of the main pole 112 is placed on a surface where the elevation is to be measured. If the laser beam receiver is centered on the laser beam the elevation is correct. If the laser beam receiver is lowered together with the secondary tube 122 to be centered on the beam, the scale 162 will indicate directly how much soil remains to be removed. If the laser beam receiver is raised together with the secondary tube 122, to be centered on the laser beam, the scale 160 will indicate directly how much fill needs to be added. No calculations are required to determine deviations in elevation from the desired elevation.

The disclosed embodiments are representative of presently preferred forms of the invention, but are intended to illustrative rather than definitive of. The invention is defined in the claims.

What is claimed is:

1. A civil engineering elevation measuring stick for use in a laser beam elevation measuring system comprising:
   a primary pole including a primary pole top end, a primary pole bottom end, at least four primary pole flat outer wall surfaces that extend from the primary pole top end to the primary pole bottom end, and having a selected primary pole length;
   a secondary tube telescopically receiving the primary pole and including a secondary tube top end, a secondary tube bottom end, a secondary tube length extending from the secondary tube top end to the secondary tube bottom end that does not substantially exceed half the selected primary pole length, a first flat secondary wall, a second flat secondary wall, a third flat secondary wall, a fourth flat secondary wall, and wherein each of the first, second, third and fourth secondary flat wall extend from the secondary tube bottom end to the secondary tube top end and have a pair of parallel spaced apart side edges;
   a pair of spaced apart bottom apertures adjacent to the secondary tube bottom end and through each of the first, second, third and fourth flat secondary walls;
   a pair of spaced apart top apertures adjacent to the secondary tube top end and through each of the first, second, third and fourth flat secondary walls;
   a top ball bearing with a diameter that exceeds the secondary tube wall thickness mounted in each aperture of the pair of spaced apart top apertures;
   a bottom ball bearing with a diameter that exceeds the secondary tube wall thickness mounted in each aperture of each of the pairs of spaced apart bottom apertures;
   a plurality of ball bearing retainers that hold the top ball bearings and the bottom ball bearings in the pairs of spaced apart top apertures and the pairs of spaced apart bottom apertures and prevent contact between an inside surface of the secondary tube and the primary pole;
   at least one measurement scale affixed to the primary pole;
   a top end cap attached to the primary pole top end that limits upward movement of the secondary tube relative to the primary pole;
   a bottom end cap attached to the primary pole bottom end that limits downward movement of the secondary tube relative to the primary pole; and
   a laser beam receiver mounting surface on the secondary tube.

2. A civil engineering elevation measuring stick for use in a laser beam elevation measuring system comprising:
   a primary pole including a primary pole top end, a primary pole bottom end, at least four primary pole flat walls that extend from the primary pole top end to the primary pole bottom end, a primary pole center portion, and having a selected primary pole length;
   a secondary tube telescopically receiving the primary pole and including a secondary tube top end, a secondary tube bottom end, a secondary tube length extending from the secondary tube top end to the secondary tube bottom end that does not substantially exceed half the selected primary pole length, a secondary tube wall thickness, a first flat secondary wall, a second flat secondary wall, a third flat secondary wall, a fourth flat secondary wall, and wherein each of the first, second, third and fourth secondary flat walls extend from the secondary tube bottom end to the secondary tube top end and have a pair of parallel spaced apart side edges;
   a pair of spaced apart bottom apertures adjacent to the secondary tube bottom end and through each of the first, second, third and fourth flat secondary walls;
   a pair of spaced apart top apertures adjacent to the secondary tube top end and through each of the first, second, third and fourth flat secondary walls;
   a top ball bearing with a diameter that exceeds the secondary tube wall thickness mounted in each aperture of the pair of spaced apart top apertures;

a bottom ball bearing with a diameter that exceeds the secondary tube wall thickness mounted in each aperture of each of the pairs of spaced apart bottom apertures;

a plurality of ball bearing retainers that hold the top ball bearings and the bottom ball bearings in the pairs of spaced apart top apertures and the pairs of spaced apart bottom apertures and prevent contact between an inside surface of the secondary tube and the primary pole;

a first measurement scale affixed to the primary pole that starts at zero in the primary pole center portion and increases toward the primary pole top end;

a second measuring scale affixed to the primary pole that starts at zero in the primary pole center portion and increases toward the primary pole bottom end;

a scale viewing aperture in the first flat secondary wall midway between the secondary tube top end and the secondary tube bottom end and a position indicator carried on the secondary tube and extending across the scale viewing aperture;

a top end cap attached to the primary pole top end that limits upward movement of the secondary tube relative to the primary pole;

a bottom end cap attached to the primary pole bottom end that limits downward movement of the secondary tube relative to the primary pole; and a laser beam receiver mounting surface on the secondary tube.

3. A civil engineering elevation measuring stick for use in a laser beam elevation measuring system, as set forth in claim 2, including a third measuring scale that is identical to the first measuring scale and affixed to an opposite side of the primary pole from the first measuring scale, a fourth measuring scale that is identical to the second measuring scale and affixed to an opposite side of the primary pole from the second measuring scale; and a second scale viewing aperture in the third flat secondary wall midway between the secondary tube top end and the secondary tube bottom end and a second position indicator carried by the secondary tube and extending across the secondary scale viewing aperture that indicates positions on the third and fourth measuring scales.

4. A civil engineering elevation measuring stick for use in a laser beam elevation measuring system, as set forth in claim 2, including a clamp screw on the secondary tube for locking the secondary tube in any one of an infinite numbers of positions along the length of the primary pole.

5. A civil engineering elevation measuring stick for use in a laser beam elevation measuring system, as set forth in claim 4, including a wear strip between the clamp screw and the primary pole.

6. A civil engineering measuring stick for use in a laser beam elevation measuring system, as set forth in claim 2 wherein the first measuring scale and the second measuring scale start at zero at a common index point on the primary pole.

7. A civil engineering elevation measuring stick for use in a laser beam elevation measuring system comprising:

a primary tubular pole including a primary pole top end, a primary pole bottom end, at least four primary pole flat walls that extend from the primary pole top end to the primary pole bottom end, a selected primary pole length, and a slot in one of the primary pole flat walls that extends from the primary pole bottom end to a center portion of the primary pole flat wall;

a secondary tube telescopically receiving the primary tubular pole and including a secondary tube top end, a secondary tube bottom end, a secondary tube length extending from the secondary tube top end to the secondary tube bottom end that does not substantially exceed half the selected primary pole length, a secondary tube wall thickness, a first flat secondary wall, a second flat secondary wall, a third flat secondary wall, a fourth flat secondary tube wall, and wherein each of the first, second, third and fourth secondary flat walls extend from the secondary tube bottom end to the secondary tube top end and have a pair of parallel spaced apart side edges;

a pair of spaced apart bottom apertures adjacent to the secondary tube bottom end and through each of the first, second, third and fourth flat secondary walls;

a pair of spaced apart top apertures adjacent to the secondary tube top end and through each of the first, second, third and fourth flat secondary walls;

a top ball bearing with a diameter that exceeds the secondary tube wall thickness mounted in each aperture of the pair of spaced apart top apertures;

a bottom ball bearing with a diameter that exceeds the secondary tube wall thickness mounted in each aperture of each of the pairs of spaced apart bottom apertures;

a plurality of ball bearing retainers that hold the top ball bearings and the bottom ball bearings in the pairs of spaced apart top apertures and the pairs of spaced apart bottom apertures and prevent contact between an inside surface of the secondary tube and the primary pole;

a primary pole measurement scale on the primary tubular pole and having a zero mark or index mark near the primary pole top end and extending downward toward the primary pole bottom end and ending near the primary pole center portion;

a top end cap attached to the primary pole top end that limits upward movement of the secondary tube relative to the primary tubular pole;

a bottom end cap attached to the primary pole bottom end that limits downward movement of the secondary tube relative to the primary tubular pole;

a spring hook clamped to the secondary tube near the secondary tube bottom end and extending through the slot in one of the primary pole flat walls; and a tension spring inside the primary tubular pole with an upper spring end anchored to the primary pole top end and with a lower spring end anchored to the spring hook and urging the secondary tube toward the primary pole top end.

8. A method of making a civil engineering elevation measuring stick for use in a laser beam elevation measuring system comprising:

mounting a secondary tube on a primary pole, that is substantially twice the length of the secondary tube with the primary pole extending through the secondary tube;

mounting a plurality of bearings within apertures located at each one on the secondary tube that engage the primary pole, prevent engagement between a secondary tube interior surface and the primary pole and permit the secondary tube to slide relative to the primary pole;

attaching a bottom end cap and a top end cap to the primary pole that limits sliding movement of the secondary tube to a path between the end caps that is substantially twice a secondary tube length; and attaching a measuring scale to the primary pole that indicates the deviation between the position of a bottom surface of the measuring stick and a desired grade surface.

* * * * *